May 8, 1962 R. L. LOGAN 3,034,029
PLURAL MOTOR SELECTIVE CONTROL SYSTEM
Filed July 22, 1958 2 Sheets-Sheet 1
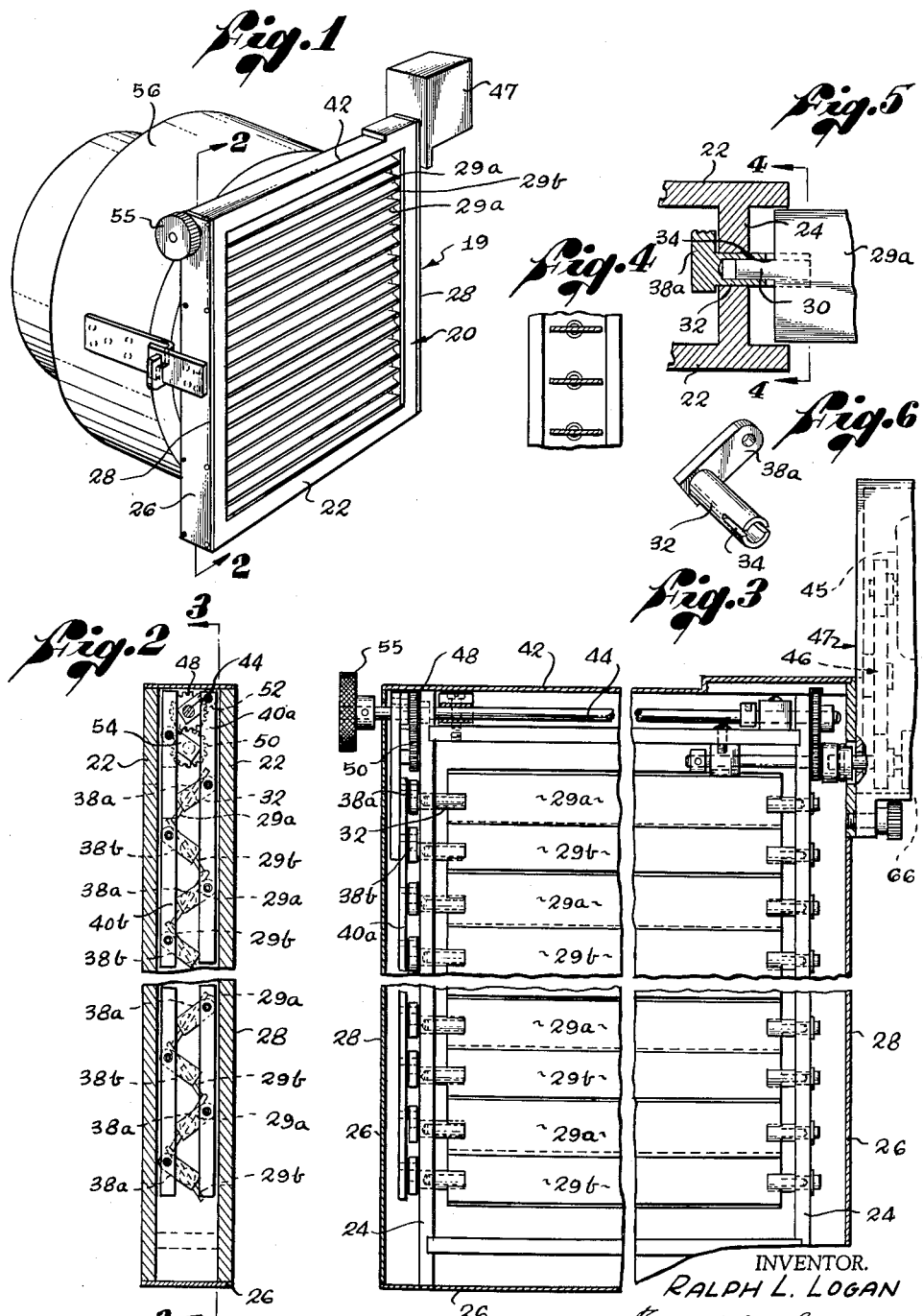
INVENTOR.
RALPH L. LOGAN
BY Forrest J. Lilly
ATTORNEY May 8, 1962 R. L. LOGAN 3,034,029
PLURAL MOTOR SELECTIVE CONTROL SYSTEM
Filed July 22, 1958 2 Sheets-Sheet 2

INVENTOR
RALPH L. LOGAN
BY Forrest J. Lilly
ATTORNEY

United States Patent Office 3,034,029
Patented May 8, 1962

3,034,029
PLURAL MOTOR SELECTIVE CONTROL SYSTEM
Ralph L. Logan, Los Angeles, Calif., assignor to J. G. McAlister, Inc., Hollywood, Calif., a corporation of California
Filed July 22, 1958, Ser. No. 750,205
6 Claims. (Cl. 318—103)

This invention relates generally to improvements in the control of artificial illumination for motion picture sets, and more particularly to an improved shutter-type light control system for motion picture studio lamps.

Motion picture sets are generally illuminated by a large number of so-called studio lamps. During the filming of a motion picture, it is frequently necessary to adjust the illumination afforded by the lamps. When shooting with color film, the illumination afforded by the lamps is controlled by means of shutters mounted in front of the lamps, rather than by adjusting the intensity of the lamps themselves, in order to avoid certain undesirable chromatic effects which occur in the latter form of illumination control.

Generally speaking, the shutters consist of a frame mounting a series of pivotal shutter blades. These blades are movable in one direction to diminish the intensity of illumination and in the opposite direction to increase the intensity of illumination.

In order to faciliate and achieve more accurate control of the illumination, the shutters on all of the studio lamps on a set are generally controlled from a master control panel. In the past, the shutters on groups or banks of studio lamps could be simultaneously controlled from this master control panel. Also, the shutters on one bank of lamps could be controled independently of the shutters on another bank of lamps.

It is frequently desirable or essential, however, for various reasons, such as to achieve certain special effects, to adjust the shutters in a single bank of lamps individually. This was impossible with the prior shutter control systems except by manual operation of the individual shutters by an operator stationed at each lamp. That is, the shutters in a single bank of lamps could not be individually controlled from the master control panel.

A broad object of the present invention is the provision of an improved shutter control system of the character described.

A more specific object of the invention is the provision of a shutter control system of the character described embodying a master control panel from which the individual shutters of a group, as well as an entire group or several groups, of light control shutters for studio lamps may be selectively controlled.

Another object is the provision of a shutter control system of the character described in which desired adjustments of the shutters may be preset.

Yet another object of the invention is the provision of a shutter control system of the character described which is relatively simple in construction, easy to operate, and otherwise especially well suited to its intended function.

A further object is the provision of an improved shutter for studio lamps.

Briefly, the objects of the invention are attained by the provision of a shutter control system equipped with a series of position control circuits each including a reversible motor for operating a respective one of the shutters to be controlled. These position control circuits are of the well known balanced bridge type that include a manually adjustable potentiometer in circuit with a potentiometer which is positioned by the respective shutter motor.

When the bridge of one of the control circuits is unbalanced by adjustment of its respective manual potentiometer, an error signal is fed to the corresponding shutter motor. This error signal causes driving of the motor in a direction to rebalance the bridge.

The several individual shutter control potentiometers are mounted on a master control panel to permit individual adjustment of the shutters from the panel. Also mounted on this control panel are a series of master control potentiometers each associated with a particular shutter group. Switches on the panel permit these master potentiometers to be selectively switched into any of the position control circuits of their respective shutter group so as to enable group operation of several or all shutters of a group.

Simultaneous adjustment of shutters in several or all of the shutter groups is accomplished by a grand master potentiometer on the control panel which may be selectively switched into the position control circuits of the several shutter groups. The several position control circuits may also be selectively deactivated from the control panel to permit presetting of the control potentiometers without altering a particular shutter adjustment.

The invention may be best understood from the following detail description when taken in connection with the annexed drawings, wherein:

FIG. 1 is a perspective view of a present improved shutter mounted on a studio lamp;

FIG. 2 is an enlarged section taken along line 2—2 of FIG. 1;

FIG. 3 is a section taken along line 3—3 of FIG. 2;

FIG. 4 is a section taken along line 4—4 of FIG. 5;

FIG. 5 is an enlarged section through one end of a vane of the shutter;

FIG. 6 is a detail, in perspective, of a part of the shutter;

Figure 7:
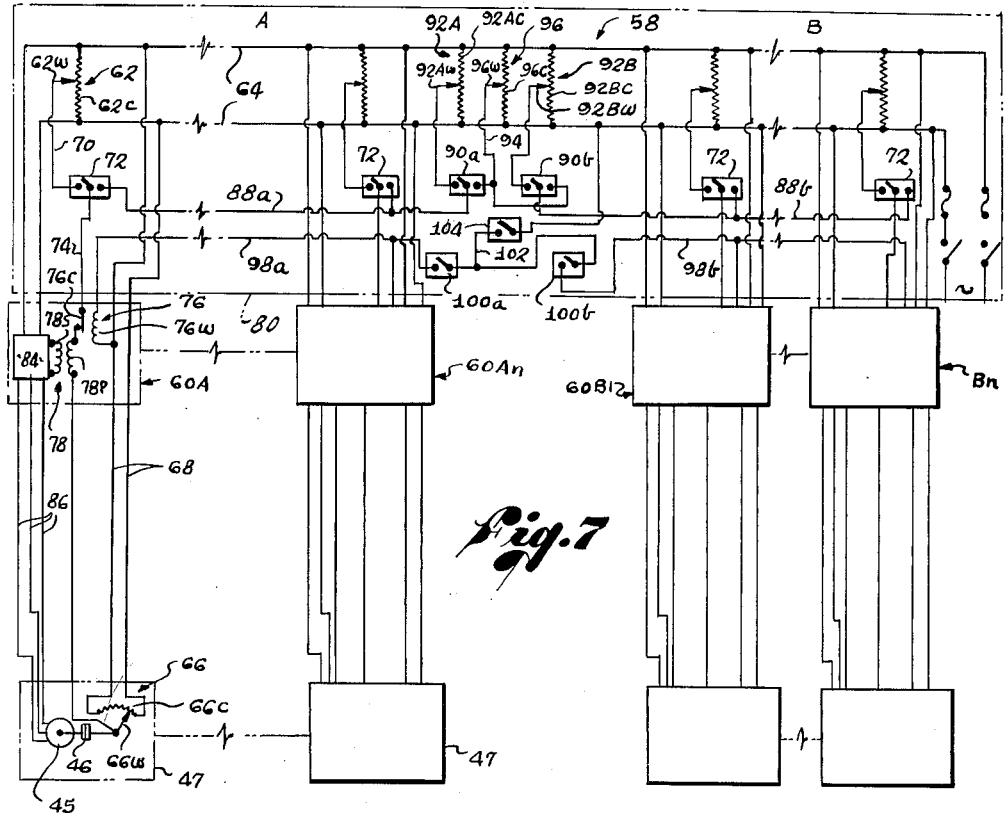
FIG. 7 is a schematic illustration of the present shutter control system.

Reference is now made to FIGS. 1–6 of these drawings illustrating one of the improved studio lamp shutters for use in the present control system. The shutter, generally indicated at 19, consists of a rectangular frame 20. Each section of this frame is generally H-shaped in cross-section, as shown in FIG. 5, and includes a pair of side walls 22 which are joined by a web 24. The open outer sides of these H-shaped sections are closed by outer walls 26.

Extending between the two vertical side sections 28 of the frame 20 are a series of narrow shutter blades or vanes which have been alternately designated as 29a and 29b, for reasons to be seen. Each of these vanes has a pair of reduced extensions 30 (FIG. 5) at its ends. Journalled in the webs 24 of the frame sections 28 are pairs of coaxial pins 32. Pins 32 are actually bored and slotted, as shown in 34, for slideably receiving the ends and extensions 30 of the vanes 29a and 29b. The vanes are, therefore, supported for pivotal movement on the frame 20. The slideable connections between the pins and vanes accommodate thermal expansion and contraction of the parts.

Fixed to the outer ends of the left-hand pins 32 on the shutter vanes 29a are radial arms 38a. Similarly, the outer ends of the left-hand pins 32 on the shutter vanes 29b fixedly mount radial arms 38b. Arms 38a are pivotally connected to a bar 40a which extends lengthwise of the left-hand, vertical frame section 28 at one side of the pins 32. Arms 38b, on the other hand, are pivotally connected to a bar 40b which extends lengthwise of the left-hand frame section 28 at the diametrically opposite side of the pins 32.

Journalled on and extending lengthwise of the top section 42 of the frame 20 is a shaft 44. One end of this shaft is coupled to a motor 45, mounted on the upper end of the right-hand frame section, through reduction gearing 46. Motor 45 and the reduction gearing are contained in a housing 47.

Shaft 44 fixedly mounts a gear 48 at its left end. This gear meshes with a pinion 50 which is journalled on the upper end of the left side frame section 28. Gear 48 and pinion 50 have the same number of teeth so that rotation of the gear through a given angle causes rotation of the pinion through the same angle.

The upper end of bar 40a is pivotally connected to a radial arm 52 rigid on the gear 48, while the upper end of the bar 40b is pivotally connected to a radial arm 54 rigid on pinion 50. Arms 52 and 54 are so angularly arranged on the gear and pinion, respectively as to be inclined at the same angle to opposite sides of a plane passing through the axes of the gear and pinion, as shown. From this description, it will be apparent that rotation of shaft 44 in one direction produces equal downward movement of the bars 40a and 40b. Similarly, rotation of the shaft in the opposite direction produces equal upward movement of the bars.

It will also be observed that downward movement of the bars rocks the vanes 29a in a clockwise direction (as viewed in FIG. 2) and the vanes 29b in a counter-clockwise direction. Upward movement of the bars, on the other hand, rocks the vanes 29a in a counterclockwise direction and the vanes 29b in a clockwise direction.

The vanes are so angularly oriented that at the lower limit of movement of the bars 40a and 40b, the vanes occupy their open position of FIG. 4, wherein they are disposed in parallel planes normal to the plane of the frame 20. At the upper limit of movement of the bars, the vanes occupy their closed position of FIG. 2 wherein adjacent vanes are inclined to one another and their edges are in contact, or overlap slightly, as shown. During movement of the bars 40a and 40b between these limiting positions, adjacent vanes turn in opposite directions through approximately 45 degree angles. A handle 55 is fixed to the shaft 44 to permit manual turning of the latter.

In use, the shutter described above is mounted in front of a studio lamp 56, as shown in FIG. 1. Turning of the shutter vanes 29a and 29b from their open position to their closed position gradually diminishes the intensity of the illumination furnished by the lamp. Turning of the vanes to their open position, on the other hand, gradually increases the intensity of the illumination furnished by the lamp.

As preliminarily mentioned, a large number of studio lamps, each mounting a shutter 19, are arranged in banks or groups about a movie set. At times it is necessary to adjust the shutters in one or more groups individually. At other times several or all of the shutters of one group or several groups must be adjusted simultaneously. FIG. 7 illustrates the present control system 58 which permits such individual and group adjustment of the shutters.

For simplicity, the control system has been illustrated as including only two shutter groups identified as A and B. It will become clear as the description proceeds, however, that additional shutter groups may be included in the control system.

Control system 58 comprises a series of identical position control circuits 60A1–60An, 60B1–60Bn, each associated with a shutter 19. Certain portions of these control circuits are conventional, and accordingly have been schematically illustrated. Moreover, since the several circuits are identical, only one, namely, circuit 60A1, has been illustrated in any detail and will be described. Position control circuit 60A1 is of the type described on pages 179–184 of the text entitled Electronic Motor and Welder Controls, by George M. Chute, a McGraw-Hill publication, 1951. This circuit comprises a first, individual, shutter control potentiometer 62. The coil 62c of this potentiometer is connected across a pair of A.C. supply leads 64.

The circuit includes a second potentiometer 66. Potentiometer 66 has a coil 66c connected in parallel with the coil 62c across the A.C. leads 64 through leads 68.

The wiper 62w of potentiometer 62 is connected through a lead 70 to one terminal of a single pole, double throw, individual shutter selector switch 72. The blade of switch 72 is connected via a lead 74 including normally closed contacts 76c of a relay 76, and the primary winding 78p of a transformer 78 to the wiper 66w of potentiometer 66.

Potentiometer 66 and switch 72 are mounted on a master control panel 80. Potentiometer 66 is mounted within the motor housing 47 on its respective shutter 19 and is connected through reduction gearing 46 to the shaft of the corresponding shutter motor 45.

The secondary winding 78s of transformer 78 is connected to an amplifying and direction control circuit 84, the output of which is connected via leads 86 to the shutter motor 45. Circuit 84, which may be of the type described in the text, previously referred to, has been only schematically illustrated.

It will be apparent from the above description that the potentiometers 62, 66 and the transformer primary 78p are connected to form a Wheatstone bridge circuit. The potentiometers 62 and 66 form the bridge resistors of the bridge.

Assuming the switch 72 to be closed to the left and relay contacts 76c to be closed, no current will flow through the primary 78p when the wipers 62c and 66c are at the same positions along their coils. Shutter motor 45, therefore, remains inoperative.

Manual adjustment of the wiper 62w of the individual control potentiometer 62, in either direction from this balanced position, unbalances the bridge. This unbalance gives rise to a current flow through the primary 78p which, in turn, induces an error voltage in the secondary 78s related to the direction and magnitude of the unbalance.

The circuit 84 responds to this error voltage by energizing the motor 45 to drive the wiper 66w of the motor driven potentiometer 66 in a direction to rebalance the bridge. The motor 45 then stops. Thus, the vanes of the shutter 19 associated with position control circuit 60A1 may be moved to any desired position from the control panel 80 by appropriate adjustment of the individual control potentiometer 62. A more detailed operational description of a position control circuit of this character is set forth in the previously mentioned text.

The remainder of the position control circuits are identical to and connected to the A.C. leads 64 in precisely the same way as circuit 60A1. Group operation of the shutters is accomplished as follows.

The second terminals of the several individual shutter selector switches 72 associated with the shutters of group A are connected through common lead 88a to the blade of a first master selector switch 90a. Similarly, the second terminals of the several individual shutter selector switches 72 associated with the shutters of group B are connected through a lead 88b to the blade of a second master selector switch 90b.

The left-hand terminals of the switches 90a and 90b are connected to the wipers 92aw and 92bw, respectively, of a pair of group master control potentiometers 92a and 92b on the control panel 80. The coils 92ac and 92bc of these potentiometers are connected across the A.C. leads 64, as shown.

The right-hand terminals of the master selector switches 90a and 90b are connected through a common lead 94 to the wiper 96w of a grand master control potentiometer 96, on the control panel 80. The coil 96c of this latter potentiometer is connected across the A.C. leads 64.

From the description thus far of the control system, it will be seen that individual adjustment of any shutter in the control system may be accomplished by placing the blade of its respective individual selector switch 72 in its left-hand position and adjusting the corresponding individual control potentiometer 62.

When several or all of the shutters of one group, say group A, are to be adjusted simultaneously, the blades of the corresponding individual selector switches 72 are placed in their right hand, master control positions and the blade of the corresponding master selector switch, switch 90a in the example cited, is placed in its left-hand, group master position.

A study of the drawings will show that this cuts out the individual control potentiometers 72 of group A and connects the group master control potentiometer 92A in their place in parallel in the several position control circuits. Simultaneous adjustment of the shutters of group A may now be accomplished by adjustment of the group master potentiometer 92.

At times, it is desirable to simultaneously adjust several or all of the shutters in both shutter groups A and B. This is accomplished by placing the blades of the corresponding individual selector switches 72 in their right-hand master control positions and the blades of the master selector switches 90a and 90b in their right-hand grand master control positions. This action cuts out the individual and group master control potentiometers and connects the grand master control potentiometer 96 in their place in parallel in the several position control circuits of the two shutter groups.

The several shutters in both groups may now be simultaneously adjusted by adjustment of the grand master control potentiometer 96. Obviously, some or all additional shutter groups which may be embodied in the control system may be controlled in the same way.

Each relay 76 includes a winding 76w. One terminal of these windings is connected to one of the A.C. leads 64, as shown. The other terminal of the relay windings 76w in the position control circuits of group A are connected through a common lead 98a to one terminal of a group preset switch 100a. Similarly, the other terminals of the relay windings 76w in the position control circuits of group B are connected through a common lead 98b to one terminal of a second group preset switch 100b.

The other terminals of these group preset switches are connected via a common lead 102 including a master preset switch 104, to the other A.C. lead 64. From this description, it will be seen that the relay windings 76w of group A may be energized by closing the group preset switch 100a and master preset switch 104. The relay windings 76w of group B may be similarly energized by closing group preset switch 100b and master preset switch 104.

Energizing of the relay windings 76w opens the relay contacts 76c. The circuits through the transformer primaries 78p are thereby opened. This permits the individual control potentiometers 62, group master control potentiometers 92a and 92b, or the grand master potentiometer 96, as the case may be, to be adjusted without altering a particular shutter setting. The potentiometers may thus be preset to obtain a desired shutter position while the shutters themselves remain in a previously adjusted position.

Operation of the control system will now be apparent. Thus, individual adjustment of the several shutters is accomplished by placing the blades of the individual selector switches 72 in their left-hand position and adjusting the individual control potentiometers 62.

When several or all shutters in a single shutter group are to be simultaneously operated, the blades of the appropriate selector switches 72 of that group are placed in their right-hand master control position. The blade of the corresponding group master selector switch 90a or 90b is placed in its left group master position. Adjustment of the respective group master potentiometer 92a or 92b then effects simultaneous adjustment of the selected shutters of the group.

If several or all of the shutters in both shutter groups are to be simultaneously adjusted, the blades of both group master selector switches 90a and 90b are shifted to their right-hand grand master position. The grand master control potentiometer is then adjusted to simultaneously operate the selected shutters or all of the shutters of both groups.

Obviously, additional shutter groups may be controlled in the same way.

Figure 8:
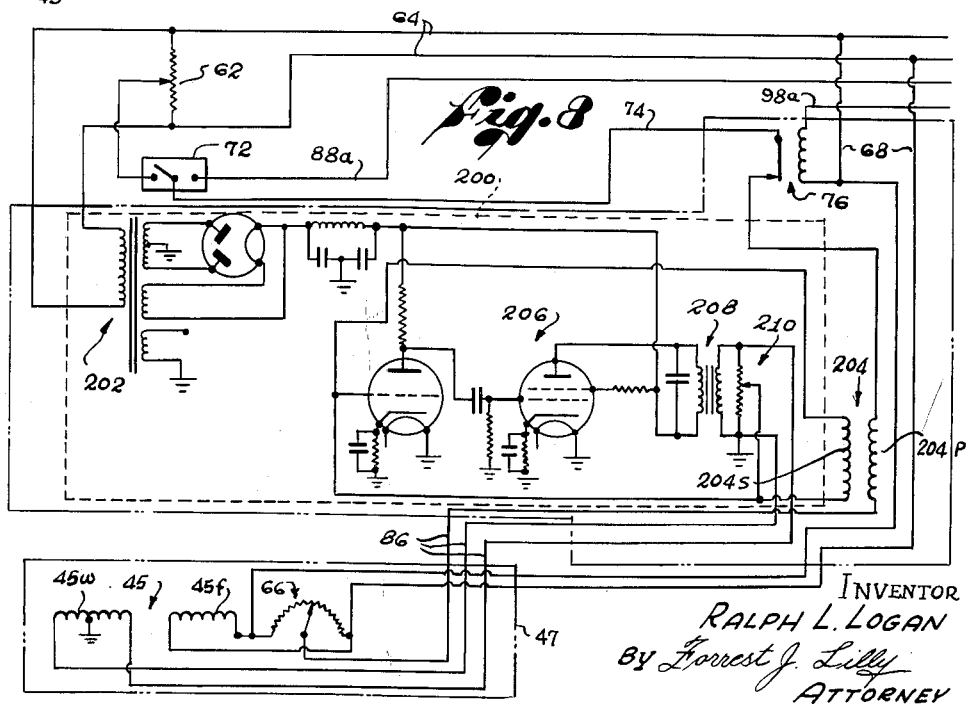
FIG. 8 illustrates a modified control system.

FIG. 8 illustrates an alternative amplifier and direction control circuit 200 which may be used in place of the circuit 84 of FIG. 7. Circuit 200 is powered from the A.C. lines 64 through a transformer 202.

In FIG. 8, the error signal induced in the secondary 204s of the bridge transformer 204, which corresponds to the transformer 78 of FIG. 7, when the bridge is unbalanced by adjustment of one of the control potentiometers, is amplified at 206. The amplified error signal is applied to the armature winding 45w of the respective shutter motor 45, through a transformer 208 and a feedback control 210. The field winding 45f is connected in parallel with the respective motor driven potentiometer 66, as shown.

As in the previous form of the invention, this error signal causes the shutter motor 45 to drive in a direction to rebalance the bridge.

It will be apparent, therefore, that there have been described and illustrated an improved studio lamp shutter and control system therefor which are fully capable of attaining the objects preliminarily set forth.

I claim:

1. In combination with a plurality of studio-lamp shutters of the character described, each shutter including a plurality of pivotal vanes and a reversible motor for moving the vanes of the respective shutter, a control system for the motors of the several shutters comprising a plurality of manually adjustable, electrical shutter position control devices associated with said shutter motors, respectively, and an electrical position control circuit connecting each shutter position control device and its associated shutter motor for causing the latter to drive its respective shutter vanes to a position related to the setting of its associated shutter position control device, a master control panel mounting said shutter position control devices for selective adjustment of the latter at said control panel whereby to effect individual adjustment of said shutters, said shutters being arranged in a plurality of groups, a plurality of master, manually adjustable, electrical shutter position control devices associated with said groups, respectively, and mounted on said control panel for selective adjustment at the panel, and manually operable switch means on said control panel for selectively switching each master shutter position control device into any selected one or more of the position control circuits for the shutters of its respective group and switching out the first-mentioned shutter position control devices of the selected circuits whereby to enable selective individual or group control of said shutters.

2. In combination with a plurality of studio-lamp shutters of the character described, each shutter including a plurality of pivotal vanes and a reversible motor for moving the vanes of the respective shutter, a control system for the motors of the several shutters comprising a plurality of manually adjustable, electrical shutter position control devices associated with said shutter motors, respectively, and an electrical position control circuit connecting each shutter position control device and its associated shutter motor for causing the latter to drive its respective shutter vanes to a position related to the setting of its associated shutter position control device, a master control panel mounting said shutter position control devices for selective adjustment of the latter at said control panel whereby to effect individual adjustment of said shutters, said shutters being arranged in a plurality of groups, a plurality of master, manually adjustable, electrical shutter position control devices associated with said groups, respectively, and mounted on said control panel for selective adjustment at the panel, manually operable switch means on said control panel for selectively switching each master shutter position control device into any selected one or more of the position control circuits for the shutters of its respective group and switching out the first-mentioned shutter position control devices of the selected circuits whereby to enable selective individual or group control of said shutters, a grand master, manually adjustable, electrical shutter position control device on said control panel, and switch means on said panel for selectively switching said grand master shutter position control device into selected position control circuits for the shutters of any one or more shutter groups and switching out the first-mentioned shutter position control devices of the latter selected circuits whereby to enable selective individual operation of the shutters of the several groups, simultaneous operation of a selected shutter group, and simultaneous operation of selected shutters in a plurality of shutter groups.

3. In combination with a plurality of studio-lamp shutters of the character described, each shutter including a plurality of pivotal vanes and a reversible motor for moving the vanes of the respective shutter, a control system for the motors of the several shutters comprising a plurality of manually adjustable, electrical shutter position control devices associated with said shutter motors, respectively, and an electrical position control circuit connecting each shutter position control device and its associated shutter motor for causing the latter to drive its respective shutter vanes to a position related to the setting of its associated shutter position control device, a master control panel mounting said shutter position control devices for selective adjustment of the latter at said control panel whereby to effect individual adjustment of said shutters, and means including manually operable switch means on said control panel for opening said circuits to permit presetting of said position control devices without affecting the positions of the shutters.

4. In combination with a plurality of studio-lamp shutters of the character described, each shutter including a plurality of pivotal vanes and a reversible motor for moving the vanes of the respective shutter, a control system for the motors of the several shutters comprising a plurality of manually adjustable, electrical shutter position control devices associated with said shutter motors, respectively, and an electrical position control circuit connecting each shutter position control device and its associated shutter motor for causing the latter to drive its respective shutter vanes to a position related to the setting of its associated shutter position control device, a master control panel mounting said shutter position control devices for selective adjustment of the latter at said control panel whereby to effect individual adjustment of said shutters, said shutters being arranged in a plurality of groups, a plurality of master, manually adjustable, electrical shutter position control devices associated with said groups, respectively, and mounted on said control panel for selective adjustment at the panel, manually operable switch means on said control panel for selectively switching each master shutter position control device into any selected one or more of the position control circuits for the shutters of its respective group and switching out the first-mentioned shutter position control devices of the selected circuits whereby to enable selective individual or group control of said shutters, a grand master, manually adjustable, electrical shutter position control device on said control panel, switch means on said panel for selectively switching said grand master shutter position control device into selected position control circuits for the shutters of any one or more shutter groups and switching out the first-mentioned shutter position control devices of the latter selected circuits whereby to enable selective individual operation of the shutters of the several groups, simultaneous operation of a selected shutter group, and simultaneous operation of selected shutters in a plurality of shutter groups, and means including manually operable switch means on said control panel for selectively opening the position control circuits for any selected one or more groups of shutters to permit presetting of said first-mentioned shutter position control devices, master shutter position control devices, or grand master shutter position control devices without altering the positions of the shutters associated with the opened position control circuits.

5. The subject matter of claim 3 wherein said shutters are arranged in a plurality of groups, and said switch means includes a plurality of separate, manually operable switches associated with the different shutter groups, respectively, and each arranged to open only the position control circuits for the shutters of its associated shutter group.

6. The subject matter of claim 4 wherein the last-mentioned switch means includes a plurality of separate, manually operable switches associated with the different shutter groups, respectively, and each arranged to open only the position control circuits for the shutters of its associated group, and a master switch for simultaneously opening the position control circuits for all of the shutters of the several shutter groups.

References Cited in the file of this patent
UNITED STATES PATENTS

| | | |
|---|---|---|
| 851,823 | Merrill | Apr. 30, 1907 |
| 1,725,117 | Walthers | Aug. 20, 1929 |
| 2,278,142 | Mack et al. | Mar. 31, 1942 |
| 2,299,887 | Fell | Oct. 27, 1942 |
| 2,407,024 | Lohmuller et al. | Sept. 3, 1946 |
| 2,683,797 | Grow | July 13, 1954 |
| 2,803,741 | Guth | Aug. 20, 1957 |
| 2,844,775 | Miller et al. | July 22, 1958 |